Dec. 8, 1964     R. T. WINDSOR     3,160,387
VALVE WITH SEATING STRUCTURE
Filed May 12, 1961

INVENTOR
Richard T. Windsor

BY *Charles L. Lovercheck*

ATTORNEY

United States Patent Office 3,160,387
Patented Dec. 8, 1964

3,160,387
VALVE WITH SEATING STRUCTURE
Richard T. Windsor, Erie, Pa., assignor to Hays Manufacturing Company, Erie, Pa., a corporation of Pennsylvania
Filed May 12, 1961, Ser. No. 109,626
9 Claims. (Cl. 251—172)

This invention relates to valves and, more particularly, to plug type valves, and is directed specifically to an improved sealing means between the rotary valve plug member and the ports of the valve body.

A plug valve has the inherent advantages of being compact and of being operable with a simple actuating motion; however, plug valves of conventional construction have serious disadvantages, not the least of which is, in some applications, the problem of providing a gas tight seal between the plug and the body. Even though this seal is made by precision machining operations and even through the plug is tapered and is lapped into the body, minor inaccuracies will result in leakage. The primary purpose of lubricant in lubricated plug valves is to compensate for inaccuracies in machining and for clearances and tolerances and thus to provide a seal between the valve and the plug. Lubricant, however, presents difficulty in application and maintenance and frequent problems arise in specifying the proper lubricant for a given application.

The present invention discloses an improved seal at the seating surface of the valve which will be self-lubricating and which will provide a positive seal over a broad range of temperatures and operating conditions.

The improved seal is made up of a washer cup shaped in cross section and disposed in a groove in the body around the discharge port and another washer in a similar groove around the entrance port. Inside this groove and between the legs of the washer is a rubber O-shaped washer or ring which acts as a resilient means to hold the bottom of the cup washer in contact with the plug.

The thick seal, combined with the preset deflection of the rubber O-washer, gives the seal a considerable length of life. That is, the life of the washer may be several hundred thousand cycles. The preloading of the cup washer by the O-ring also helps the valve to recover from scratches and imperfections caused by contamination in the system. Scratches in the seal repair themselves when the valve plug is rotated a few times under high pressure. This causes some of the Teflon material from the U-shaped washer to embed itself in the scratch and, therefore, heal the scratch. The seal is self-compensating as it wears since, as it decreases in thickness at the point it engages the plug, it permits greater bending of the lip by the O-ring.

It is, accordingly, an object of the present invention to overcome the above and other difficulties in previous plug type valves and, more particularly, it is an object to provide a valve which is simple in construction, economical to manufacture, and simple and efficient to use.

Another object of the invention is to provide an improved plug valve.

Still another object of the invention is to provide an improved seal in a plug valve.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
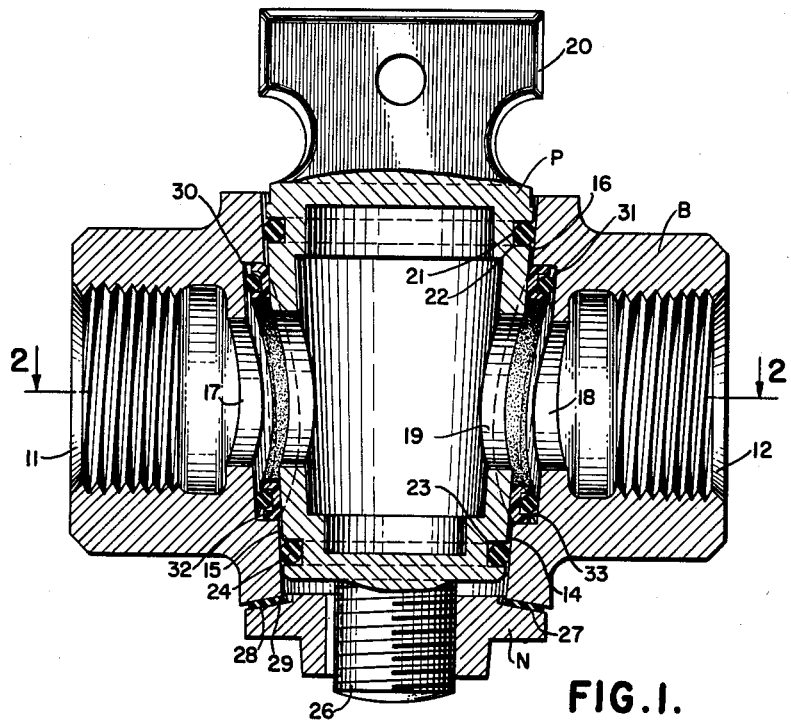
FIG. 1 is a longitudinal cross sectional view of a valve according to the invention.
Figure 2:
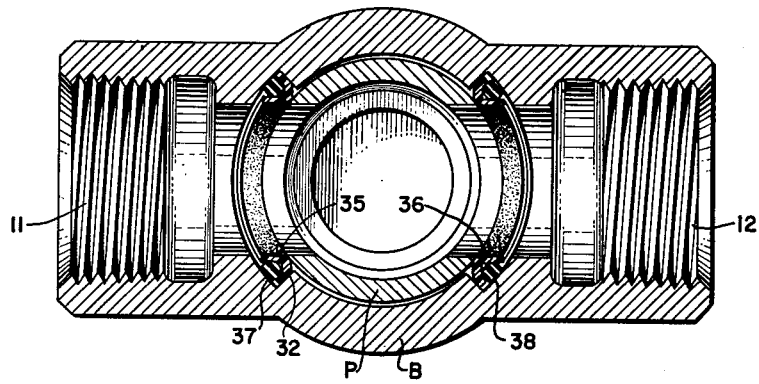
FIG. 2 is a cross sectional view taken on line 2—2 of FIG. 1.

Now with more particular reference to the drawing, a valve is shown having a body B, a plug P, and a bottom washer nut N. The body B has an inlet 11 and an exit 12 through the hollow therein. A transverse bore 14 is finished with seating surfaces 15 and 16 around the entrance and exit ports 17 and 18, respectively.

The plug P is hollow and has an opening 19 therethrough. The plug may be rotated by means of a key head 20 to bring the opening 19 into alignment with the inlet and exit or outlet 12 as shown. The plug may also be rotated ninety degrees to turn the opening 19 out of alignment with the ports 17 and 18 to stop flow therethrough.

The outside surface of the plug P is finished to generally conform to the seating surfaces 15 and 16. The top of the plug has a circumferential groove 21 in which an O-ring 22 is disposed and the lower end of the plug has a circumferential groove 23 in which an O-ring 24 is disposed. The O-rings 22 and 24 are slightly less in cross sectional dimension than the width of the grooves, yet greater in cross sectional dimension than the depth of the grooves so that the O-rings are slightly deformed when placed in the grooves in the position shown. Thus, the O-rings 22 and 24 provide a seal between the plug and the body.

The lower end of the plug P has a threaded end 26 thereon which receives a combined nut and washer 27. The nut and washer 27 has a flange which has an inclined surface 28 on which is disposed a bottom disk washer 29. The washer 29 may be made of a suitable washer material as required.

Figure 3:
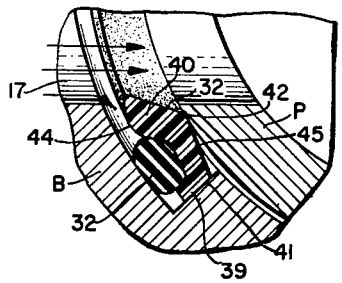
FIG. 3 is an enlarged partial cross sectional view of a part of the valve showing the action of the seal when the valve is operating under pressure.

A counterbore 30 is formed around the port 17 and a similar counterbore 31 is formed around the port 18. Sealing assemblies 32 and 33 are disposed in these counterbores. The sealing assemblies are made up of U-shaped washers 35 and 36 and O-rings 37 and 38. It will be noted that outer legs 39 of the U-shaped washers 35 and 36 are shorter than inner legs 40. The U-shaped packing washers 35 and 36 each have one short leg 39 and one long leg 40. The short leg and long leg are connected by an intermediate part 45 and diverge from each other. The short leg, when in use, rests against an outer side wall 41 of the counterbore 30. The other leg freely extends into the port 17 or the port 18 as shown. The ring 32, being of greater diameter than the space in which it rests, is distorted as shown in FIG. 3 and urges a corner 42 of the ring into engagement with the valve plug and urges the short leg 39 into engagement with the side wall 41, thereby forming a seal therebetween.

When fluid under pressure is admitted to the valve, it will engage an inside 44 of the long leg 40 and cause it to swing inwardly as shown. As the leg 40 bends inwardly, it causes the bottom of the washer 35 to curve as shown in FIG. 3 and to swing toward the O-ring, thereby further compressing the O-ring and further increasing the pressure between the short leg 39 and the wall 41. This causes the corner of the washer to engage the plug with greater pressure at 42, thereby increasing the sealing effect of the washer 35.

The sealing assembly or ring 32 may be made of a self-lubricating plastic material such as Teflon which has a low coefficient of friction between the plug and the ring and, therefore, the plug will have little resistance to rotation. The washer 29 may also be made of Teflon or a self-lubricating material so that the resistance to rotation at this point will also be small.

The thickness of the seal combined with the preset deflection of the rubber O-ring squeezed between the washer 35 and the valve body permits the seal to cover a much larger area and, since the washer is deflected, the life thereof is increased several thousand cycles. This preloading also helps the valve to recover from scratches caused by contamination in the lading that may be contained in the valve.

The design should be such that the area formed by the depth of the groove is greater than the area formed by the seal against the plug at 42. Actually, the area of contact of the washer 35 on the plug at 42 will decrease as pressure increases due to the flexing of the leg 40. Hence, the friction decreases and the sealing pressure increases as additional pressure is applied.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A plug valve comprising a hollow body having an inlet port and an outlet port defining a flow passage, a transverse bore in said body communicating with said flow passage defining a valve seat, a valve plug rotatable in said seat, said plug having an opening therethrough alignable with said flow passage, a counterbore in said body disposed around said inlet port, a cup washer having two legs and an intermediate part and disposed in said counterbore, said cup washer being disposed with its open side toward said inlet port with one leg of said cup washer engaging the outer wall of said counterbore and the inner leg thereof freely extending into the flow stream of lading in said valve, and an O-ring between the legs of said cup washer, said O-ring being of greater cross sectional area than the distance between the bottom of said cup washer and the bottom of said counterbore when the bottom of said cup washer engages said plug, said inner leg of said cup washer being adapted to be deformed by a fluid stream flowing through said valve on the inside surface thereof whereby said inner leg is deflected toward said fluid stream, the bottom of said cup washer being bent toward said O-ring and a part thereof being thereby deflected toward said plug.

2. A valve comprising an inlet port and a plug, a counterbore around said inlet port, a washer cup shaped in cross section having spaced legs connected by an intermediate part disposed in said counterbore with the legs of said cup shaped washer extending toward said port, the bottom of said cup washer engaging said plug, a first leg of said cup washer engaging the outside wall of said counterbore, the second leg of said cup washer freely extending into said port, and an O-ring between the legs of said cup washer compressed between the inside surfaces thereof and the bottom of said counterbore.

3. The valve recited in claim 2 wherein said second leg is longer than said first leg.

4. The valve recited in claim 3 wherein said legs diverge from said plug and away from each other.

5. The valve recited in claim 4 wherein said cup shaped washer is made of material having frictional properties relative to metals and plastics similar to Teflon.

6. The valve recited in claim 3 wherein said outside wall of said counterbore is inclined toward said plug and toward the fluid stream adapted to flow through said valve.

7. The valve recited in claim 6 wherein the body of said valve has an outlet port, a counterbore in said body around said outlet port, and a cup shaped washer in said counterbore around said outlet port with an O-ring therein similar to said washer and said O-ring in said first mentioned counterbore.

8. A seal between a rotatable member and a fixed member, said fixed member having a flow passage therein with an inlet port adjacent said rotatable member, a counterbore in said inlet port, a washer cup shaped in cross section having spaced legs connected by an intermediate part disposed in said counterbore with the legs of said cup shaped washer extending away from said rotatable member, the intermediate part of said cup washer engaging said rotatable member, one leg of said cup washer engaging the outside wall of said counterbore, the other leg of said cup washer freely extending into said port, and an O-ring between the legs of said cup washer compressed between the inside surfaces thereof and the bottom of said counterbore.

9. A seal in combination with a first member and a second member comprising a hole through said first member, an internal groove in said first member around said hole, said second member being disposed in said hole of said first member, a washer cup shaped in cross section having spaced legs connected by an intermediate part disposed in said groove with the legs of said cup shaped washer extending from said second member, the intermediate part of said cup washer engaging said second member, and an O-ring between the legs of said cup washer compressed between the inside surfaces thereof and the bottom of said groove.

References Cited in the file of this patent

UNITED STATES PATENTS

| | | |
|---|---|---|
| 2,048,884 | Nordstrom | July 28, 1936 |
| 2,534,477 | Prout | Dec. 19, 1950 |
| 2,599,774 | Ohls | June 10, 1952 |
| 2,898,081 | Johnson | Aug. 4, 1959 |
| 2,919,886 | Hurst | Jan. 5, 1960 |
| 2,938,704 | Quail | May 31, 1960 |
| 2,943,838 | Skei | July 5, 1960 |
| 2,945,668 | Staller | July 19, 1960 |